United States Patent [19]
Briggs

[11] Patent Number: 5,108,475
[45] Date of Patent: Apr. 28, 1992

[54] SOLVENT RECOVERY SYSTEM WITH MEANS FOR REDUCING INPUT ENERGY

[75] Inventor: Mark W. Briggs, Holland, Mich.
[73] Assignee: Venturedyne, Ltd., Milwaukee, Wis.
[21] Appl. No.: 646,387
[22] Filed: Jan. 28, 1991
[51] Int. Cl.$^5$ ............................................. F25J 3/00
[52] U.S. Cl. ............................................. 62/11; 34/79; 62/93; 62/335; 62/434
[58] Field of Search ............................ 34/79; 62/89–94, 62/434, 335, 11

[56] References Cited

U.S. PATENT DOCUMENTS

| | | | |
|---|---|---|---|
| 2,105,882 | 1/1938 | Fleisher | 62/91 |
| 2,926,506 | 3/1960 | Skaredoff | 62/259 |
| 3,091,097 | 5/1963 | Friant | 62/85 |
| 3,119,239 | 1/1964 | Sylvan | 62/93 |
| 3,232,029 | 2/1966 | Evans, Jr. | 55/71 |
| 3,415,313 | 12/1968 | Olstad | 165/60 |
| 3,585,808 | 6/1971 | Huffman | 62/93 |
| 3,587,243 | 6/1971 | Keller et al. | 62/87 |
| 3,750,415 | 8/1973 | Peuchen et al. | 62/93 |
| 3,798,920 | 3/1974 | Morgan | 62/173 |
| 3,921,413 | 11/1975 | Kohlbeck | 62/173 |
| 4,247,991 | 2/1981 | Mehta | 34/35 |
| 4,506,515 | 3/1985 | Bedolo | 62/93 |

*Primary Examiner*—Ronald C. Capossela
*Attorney, Agent, or Firm*—Jansson & Shupe, Ltd.

[57] ABSTRACT

The invention is an improvement in a vapor recovery system having a refrigeration system with two refrigerant compressors, a stack with a gaseous mixture flowing through it and a plurality of heat transfer units used to condense vaporized solvent which, along with a gas, is a constituent of the mixture. The improvement includes a heat exchange unit connected to the refrigeration system and disposed downstream of the heat transfer units. The heat exchange unit rejects heat from the refrigeration system to the gas, thereby reducing the input energy required by the refrigeration system.

12 Claims, 1 Drawing Sheet

SOLVENT RECOVERY SYSTEM WITH MEANS FOR REDUCING INPUT ENERGY

FIELD OF THE INVENTION

This invention relates generally to refrigeration systems and, more particularly, to such refrigeration systems used to recover a vaporized solvent.

BACKGROUND OF THE INVENTION

Certain industrial manufacturing processes are carried out in the presence of a volatile solvent which vaporizes as it is used. Merely by way of example, such volatile solvents are used during the manufacture or pharmaceuticals. Typically, such manufacturing processes are "ventilated" using an inert gas such as nitrogen to carry away the vaporized solvent. In some instances, it had been the practice to exhaust the gas with its entrained, vaporized solvent through a conduit such as an exhaust stack and release it to the ambient atmosphere.

More recently, environmental studies indicate (or at least strongly suggest) that vaporized solvents which are so released have an adverse effect upon the upper atmosphere. As a consequence, refrigeration systems including multistage systems of the cascade type have been developed to recover vaporized solvent.

One such system uses a pre-cooler such as a water-ethylene glycol chiller to reduce the temperature or the inert gas-vaporized solvent mixture flowing in the stack. Such temperature is reduced from a nominal ambient temperature of 70°-80° F. to a level slightly above the freezing point of water, e.g., to about 35° F., to remove moisture from such mixture. For further temperature reduction, a plurality of heat transfer units is arranged downstream of the pre-cooler. Such transfer units are connected to the refrigeration system and disposed in a heat transfer relationship to the mixture. These transfer units result in the direct transfer of heat from the mixture of vaporized solvent and gas to the units. As used herein, "direct transfer" and like phrases means transfer of heat between a medium (such as the gaseous mixture) and a refrigerant without using other heat-carrying media.

As a result of such heat transfer, the temperature of the vaporized solvent decreases to levels well below 0° F. and such solvent is thereby condensed to a liquid. It is to be appreciated that solvent recovery systems may involve very low temperatures. For example, the temperature of the gas mixture adjacent the "upstream" transfer unit may be about −5° F. while that adjacent the second or downstream transfer unit may be about −85° F. which generally corresponds to the temperature of the condensed solvent. Once the solvent is "stripped" from the mixture by condensing it, the inert gas (now substantially free of vaporized solvent) is vented to atmosphere through the exhaust end of the stack.

The solvent recovery system shown in U.S. Pat. No. 4,506,515 (Bedolo) uses a single compressor and the system evaporator does not extract heat directly from the gaseous mixture flowing in the tube. Rather, the evaporator cools an intervening media, i.e., a volume of glycol which, in turn, is circulated through a pair of heat exchangers which envelope the conduit carrying the vaporized solvent. These heat exchangers extract heat from and cool the gaseous effluents, thereby condensing the solvent.

Condensation apparently occurs at or perhaps above −20° C. (about −4° F.) since this is the lowest temperature in either heat exchanger. The condenser coil is used to reheat the gas flowing in the conduit to a temperature of about 10° C. (about 50° F.). If the refrigerant in the condenser coil is not sufficiently cooled by rejection of heat from its heat exchanger, a fan-and-coil cooling means, perhaps thermostatically controlled, is used. Frost formation is apparently a problem in the Bedolo system since the condenser coil is periodically deactivated (under control of a timer) and defrost coils are thereupon activated to get rid of condensed, frozen moisture.

Another solvent recovery system is shown in U.S. Pat. No. 3,232,029 (Evans, Jr.) and uses a two-section coil to perform cooling and heating functions. The first section cools gas to condense solvent and the second section (in series with the first section) reheats the outgoing gas. The Evans, Jr. system is similar to that shown in the Bedolo patent at least to the extent that both systems use a refrigerated coolant (as opposed to a refrigerant) to extract heat from the gas stream.

Known systems for recovering vaporized solvent tend to be characterized by certain disadvantages. In such systems using multistage cascade refrigeration, electric energy consumption is relatively high because refrigerant compression requires high input energy to the compressor electric drive motors.

Another disadvantage of low temperature recovery systems is that the inert gas leaving the exhaust stack is very cold, perhaps −85° F. a example. In other words, it is well below ambient temperature. Often, a visible plume of water vapor forms near the exhaust end of the stack as the extremely cold gas contacts warmer ambient air. Such visible plumes create unnecessary concern on the part of uninformed observers and, perhaps, unwarranted complaints to the system operator. Yet another disadvantage is that the system may exhibit "backstreaming," i.e., the migration of moisture and other infiltrating substances into the exhaust end of the stack.

An improved vapor recovery system which sharply reduces the amount of required input energy to the refrigeration system, warms the exiting gas stream to a temperature above that of ambient and helps prevent moisture and other infiltrating substances from migrating backward into the exhaust stack would be an important advance in the art.

OBJECTS OF THE INVENTION

It is an object of this invention to provide an improved vapor recovery system which overcomes the problems and shortcomings of the prior art.

Another object of this invention is to provide an improved vapor recovery system which is compatible with multistage cascade-type refrigeration systems.

Yet another object of the invention is to provide an improved vapor recovery system wherein the exiting gas stream is warmed to a temperature above ambient.

Another object of the invention is to provide an improved vapor recovery system which helps prevent moisture migration and backstreaming into the system exhaust stack.

Still another object of the invention is to provide an improved vapor recovery system which helps avoid the occurrence of visible plumes of moisture at the stack.

These and other important objects will be apparent from the descriptions of this invention which follow.

SUMMARY OF THE INVENTION

The invention is an improvement in a vapor recovery apparatus of the type having a refrigeration system with two refrigerant compressors. A conduit or stack has a gaseous mixture flowing through it in a downstream direction. Such apparatus also includes a pre-cooler and a plurality of transfer units, the latter connected to the refrigeration system. The pre-cooler and the transfer units are disposed in a heat transfer relationship to the gas mixture for directly extracting heat from such mixture to condense the vaporized solvent. The refrigeration system thereby "strips" the vaporized solvent from the gas mixture by reducing its temperature below the solvent condensation temperature. Once the solvent is removed, the substantially vapor-free gas is vented to atmosphere through the exhaust end of the stack.

The improvement comprises a refrigerant-to-gas heat exchange unit connected to the refrigeration system and disposed downstream of the transfer units, i.e., between the transfer units and the exhaust end of the stack. The heat exchange unit is in a heat transfer relationship to the gas and rejects very substantial amounts of heat from the refrigeration system to the gas, thereby reducing the input energy used by one of the two refrigerant compressors.

In a highly preferred embodiment, the refrigerant compressors include a low stage compressor having a refrigerant circuit. Such circuit has a cascade condenser connected therein and the heat exchange unit is connected in "upstream series" to the condenser. By rejecting heat to the gas, the heat exchange unit substantially reduces the heat load on such condenser and on the high stage refrigeration circuit to which it transfers heat. In other words, heat rejected to the gas stream by the heat exchange unit represents heat which the high stage compressor and its refrigerant need not accept and need not be sized to accept. This permits a significant reduction in the required input energy to the high stage compressor. In one preferred embodiment, the heat transferred to the cascade condenser is reduced by at least 60% and condenser heat load reduction on the order of 70% is not an unreasonable expectation. Such heat load reduction has very favorable implications for reducing system operating costs and "downsizing" certain system components. However, there are other benefits as well.

Such heat rejection to the gas flowing through the stack raises the temperature of such gas above that of the ambient air. The heated gas readily rises, thereby providing an updraft to prevent backflow into the exhaust end of the stack. This helps keep the stack relatively free of infiltrating substances which may otherwise migrate down into the stack. In a highly preferred embodiment, the temperature of the exiting gas is such that moisture is substantially prevented from freezing or even condensing adjacent the exhaust end of the stack. This helps keep the stack relatively free of ice and water and helps eliminate the visible plume of moisture often seen at such stacks. Notwithstanding that stack emissions are entirely in conformity with regulations, the presence of such a visible plume sometimes results in unnecessary and time-consuming contacts from concerned observers.

The invention finds great utility in solvent recovery systems which condense and thereby recover vaporized solvent at very low temperatures, often less than −50° F. In a refrigeration system having a high stage circuit and a low stage circuit arranged in cascade, there is a transfer unit in each circuit. Both such units directly transfer heat between a refrigerant and a gas. The difference between the temperature of the gas mixture adjacent the low stage transfer unit (which may be less than about −60° F.) and the temperature of gas adjacent the heat exchange unit may be in excess of 90° F. or more. In one embodiment, such temperature difference is in excess of about 180° F. As used herein, the term "direct transfer" (and like phrases) means that heat transfers between the named elements without the use of any heat-carrying intermediary. Further details of the invention are set forth below.

DETAILED DESCRIPTION OF PREFERRED EMBODIMENTS

Figure 1:
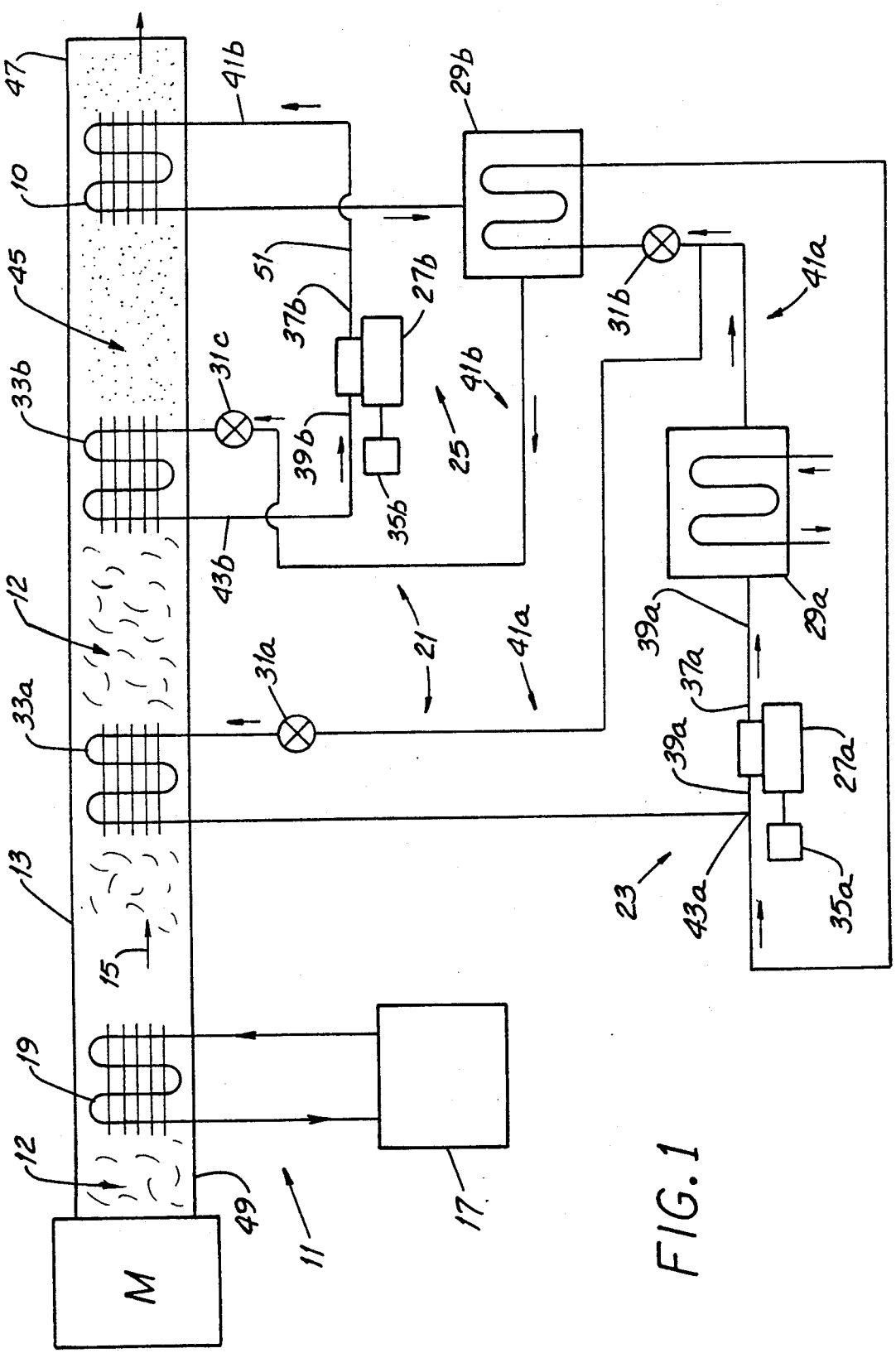
FIG. 1 is a representative schematic view of the inventive heat exchange unit shown in conjunction with a solvent recovery apparatus.

The first part of this detailed description provides a general overview of the solvent recovery apparatus. Such apparatus may be used to recover vaporized solvents (either alone or as mixed solvents) such as methylene chloride, acetone, methanol, toluene and several other highly volatile, low-condensation-temperature solvents. Following the overview, there is a brief explanation of how a conventional refrigeration circuit operates and how multistage refrigeration systems operate in cascade. This explanation is followed by more detailed descriptions of preferred embodiments of the invention.

Referring to FIG. 1, the new heat exchange unit 10 is shown in conjunction with a conventional solvent recovery apparatus 11. For purposes of description, it is assumed that a manufacturing process is carried out in the location "M" and results in a gaseous mixture 12 comprising one or more vaporized solvents mixed together with a gas such as the inert gas nitrogen. The gaseous mixture 12 is conducted away from the manufacturing site M by a conduit or stack 13 which may be arranged horizontally (as shown), vertically or angularly. Irrespective of the orientation of the stack 13, direction of movement of the gaseous mixture 12 through the stack is as shown by the arrow 15. As used herein, "gaseous mixture" means a gas, preferably an inert gas, mixed with one or more vaporized solvents.

The apparatus 11 includes a water/ethylene glycol chiller system 17 connected to a pre-cooler 19, the latter being disposed in a heat transfer relationship to the gaseous mixture 12. The apparatus 11 also includes a refrigeration system 21 having a high stage circuit 23 and a low stage circuit 25 in what is known as a cascade arrangement.

Before going into greater detail, it will be helpful to explain how a refrigeration circuit operates and how such circuits may be arranged in cascade. Using a portion of the system 21 of FIG. 1 to illustrate such operation, a refrigeration circuit uses a compressor 27a, 27b which compresses a refrigerant to a hot gaseous state. It has a condenser 29a, 29b which cools the refrigerant to a liquid (but still pressurized) state and routes such cooled refrigerant through an expansion valve 31a, 31b, 31c where it expands in the absence of significant heat transfer. Such expanded refrigerant thereby becomes extremely cold.

The expanded, very cold refrigerant is then directed to an evaporative heat transfer unit 33a, 33b (and in a cascade circuit, to a cascade condenser 29b) where it performs its task of absorbing heat. The now-heated refrigerant then returns to the compressor 27a, 27b and the cycle continues. From the foregoing, it will be understood that a refrigeration circuit is a "heat pump," absorbing heat from one location and rejecting it at another.

In a conventional two-stage cascade refrigeration system 21, the low stage circuit 25 (that in which the unit 33b operates at the lower temperature) rejects heat to what is known as a cascade heat exchanger 29b. Such cascade heat exchanger 29b is connected for refrigerant flow in the high stage circuit 23, i.e., that in which the unit 33a operates at the higher temperature. Like the unit 33a in the high stage circuit, this cascade heat exchanger 29b represents a load to the high stage compressor 27a. And the more heat "transferred" from the low stage circuit 25 into the high stage circuit 23 by the cascade heat exchanger 29b, the greater the input energy required at the high stage compressor 27b.

More particularly, the high stage circuit 23 has a high stage compressor 27a driven by an electric motor 35a or other prime mover. Such compressor 27a compresses the refrigerant flowing in the circuit 23 and discharges it from its outlet port 37a into the conductor 39b as a hot gas. The conductor 39a passes through a water-cooled condenser 29a which cools and thereby liquefies the refrigerant. Such liquid refrigerant is directed through two thermal expansion valves 31a and 31b, respectively.

That refrigerant passing through the valve 31a is directed through the unit 33a where the refrigerant absorbs heat by direct transfer from the gaseous mixture 12 flowing through the stack 13. That refrigerant passing through the valve 31b is directed through the cascade heat exchanger 29b where it absorbs heat from the low stage circuit 25. Refrigerant from the transfer unit 33a and from the exchanger 29b, now laden with heat, is routed to the inlet port 39a of the compressor 27b for re-compression.

The low stage circuit 25 includes a low stage compressor 27b which is also driven by an electric motor 35b. In a manner similar to that described above with respect to the high stage circuit 23, the refrigerant flowing from the compressor 27b rejects heat through the cascade heat exchanger 29b to the high stage circuit 23 and, following expansion in the valve 31c, passes through the unit 33b where it absorbs heat by direct transfer from the gaseous mixture 12. It is to be appreciated that the portion of a refrigerant circuit between the compressor outlet port 37a, 37b and an expansion valve 31a, 31b, 31c is the high pressure side 41a, 41b while that between an expansion valve and the compressor inlet port 39a, 39b is the low pressure side.

The transfer units 33a, 33b are sequentially disposed "downstream" of the pre-cooler 19 and in a heat transfer relationship to the flowing gaseous mixture 12. In a highly preferred embodiment, such transfer units 33a, 33b are within the stack 13 and in direct contact with such gaseous mixture 12. As the mixture 12 flows downstream in the stack 13, the pre-cooler 19 and the transfer units 33a, 33b depress the temperature of the gaseous mixture 12 to progressively lower levels. They do so, of course, by removing heat from such mixture 12. At the transfer unit 33b, the temperature of the gaseous mixture 12 is reduced to a level below the condensation temperature of the vaporized solvent. Preferably, such temperature level is several degrees below such condensation temperature for highest efficiency in solvent removal. As a result of such temperature reduction, the solvent condenses to a liquid. The apparatus 11 thereby strips the vapor from the gaseous mixture 12 Once the vapor is removed, the substantially vapor-free gas 45, e.g., nitrogen, is vented to atmosphere through the exhaust end 47 of the stack 13.

In one exemplary embodiment, the temperature or the gaseous mixture 12 at the pre-cooler is about 35° F. and that at the transfer unit 33a is about −5° F. The temperature of the substantially vapor-free gas 45 at the transfer unit 33b that at which the vaporized solvent is condensed, is about −85° F.

The improvement comprises a refrigerant-to-gas heat exchange unit 10 connected to the refrigeration system 21 and disposed downstream of the transfer units 33a, 33b, i.e., between the transfer units 33a, 33b and the exhaust end 47 of the stack 13. The heat exchange unit 10 is in a heat transfer relationship to the gas 45, preferably by positioning such unit 10 within the stack 13 in direct contact with the gas stream. Such unit 10 rejects heat from the refrigeration system 21 (and particularly from the low stage circuit 25) to the gas 45. As is further explained below, such heat rejection reduces the load on the refrigeration system 21 and the input energy used by the refrigerant compressor 27a.

More particularly, such heat exchange unit 10 is connected in what is known as the high pressure side 41b of the low stage circuit 25, i.e., that portion of the circuit 25 between the compressor output port 37b and the expansion valve 31c. Such unit 10 is connected in "upstream series" with the cascade heat exchanger 29b. When so provided and arranged, the unit 10 rejects very substantial amounts of heat to the gas stream, heat that would otherwise be transferred through the cascade exchanger 29b to the high stage circuit 23, unnecessarily loading it. The physical size and heat transfer capabilities of the heat exchanger 29b may therefore be significantly reduced.

In a highly preferred embodiment, the heat exchange unit 10 is of the refrigerant-to-gas type with fin-and-tube construction. The use of compressed refrigerant for direct heat transfer and relatively small copper or stainless steel tubing to contain such refrigerant is preferred since it minimizes the physical size of the heat exchange unit 10 with no adverse effect on its heat transferring capability. In one preferred embodiment, the high stage circuit 23 uses R-22 refrigerant and the low stage circuit 25 uses R-13 refrigerant. However, other combinations of refrigerants may be used without departing from the invention.

It is to be appreciated that other types of heat exchange units 10 (such as gas-to-gas units) can be employed without departing from the invention. However, low pressure gas-to-gas heat exchange units require very large surface areas (for equivalent heat transfer rates) and are bulky and expensive to manufacture. In addition, moisture condensation and freezing is often a problem on such units and requires a draining system to remove defrosted water and solvent without mixing the two.

A few specific parameters will further aid in understanding some of the unique benefits of the invention. In one preferred embodiment, the gaseous mixture 12 introduced at the input end 49 of the stack 13 during a one-hour period includes 1000 pounds of nitrogen and 219 pounds of vaporized solvent at about 77° F. From this flowing mixture 12, the pre-cooler 19 extracts about 15,800 BTU per hour, thereby reducing the temperature of such mixture 12 to about 35° F. as it condenses water vapor. The transfer unit 33a extracts about 31,000 BTU per hour, thereby reducing the temperature of such mixture 12 to about −5° F. The transfer unit 33b extracts about 44,800 BTU per hour, thereby reducing the temperature of such mixture to about −85° F. and condensing or stripping the vaporized solvent from the mixture 12. Using the example, the solvent condensation and removal rate will substantially equal to the rare at which it is introduced into the stack 13, i.e., about 219 pounds per hour. In other words, substantially all of the solvent is removed from the mixture 12.

It is to be understood that the total heat at the conductor 51 is about 63,100 BTU per hour of which about 18,300 BTU per hour enters the low stage circuit 25 as motor input horsepower. The remaining 44,800 BTU per hour enters the low stage circuit 25 as heat extracted from the gaseous mixture 12. Prior to the invention, all such heat (in excess of about 63,000 BTU/hour) was required to be dissipated to the cascade heat exchanger 29b. The addition of the novel heat exchange unit 10 rejects about 44,400 BTU per hour to the extremely cold stream of gas 45, thereby reducing the load on the high stage circuit 23 by a remarkable 70%.

As a result of such heat rejection, the temperature of the exiting gas 45 is increased to in excess of 100° F., well in excess of the ambient temperature for most seasons in most areas of the world, at least the industrially well-developed world. As noted above, such elevated temperature helps avoid visible plumes of moisture, helps keep the stack 13 free of water, ice and other infiltrating substances and prevents downdrafts or "backstreaming" of air and airborne matter into the stack 13.

To provide some perspective as to physical size, an exemplary stack 13 is about 3 feet by 3 feet in cross-sectional dimension at the area containing the pre-cooler 19, transfer units 33a, 33b and heat exchange unit 10 and about 1 foot in diameter downstream thereof. Of course, such dimensions may vary widely depending upon the process for which a particular apparatus 11 is designed.

While the principles of this invention have been described in connection with specific embodiments, it should be understood clearly that these descriptions are made only by way of example and are not intended to limit the scope of the invention.

I claim:

1. In a vapor recovery apparatus having a refrigeration system with two refrigerant compressors, a conduit having a gaseous mixture comprising a vapor and a gas flowing therethrough in a downstream direction, a pre-cooler, a plurality of transfer units connected to such refrigeration system and sequentially disposed in a heat transfer relationship to such mixture for directly transferring heat from such mixture to condense such vapor, the improvement comprising:

a heat exchange unit connected to such refrigeration system and disposed downstream of such transfer units in a heat transfer relationship to such gas, such heat exchange unit rejecting heat from such refrigeration system to such gas, thereby reducing the input energy used by one of the two refrigerant compressors.

2. The apparatus of claim 1 wherein the two refrigerant compressors include a high stage compressor and a low stage compressor, wherein such low stage compressor has a refrigerant circuit with a high pressure side and a condenser connected in such high pressure side and wherein such heat exchange unit substantially reduces the heat load on such condenser.

3. The apparatus of claim 2 wherein such heat exchange unit is of the refrigerant-to-gas type and is connected in upstream series with such condenser.

4. The apparatus of claim 3 wherein the heat load on such condenser is reduced by at least 35%.

5. The apparatus of claim 3 wherein the heat load on such condenser is reduced by at least 60%.

6. The apparatus of claim 1 wherein the conduit has an exhaust end from which gas flows to ambient air and wherein the temperature of such flowing gas is above that of the ambient air, thereby providing an updraft to prevent backflow into the exhaust end of the conduit.

7. The apparatus of claim 6 wherein the temperature of such gas flowing to ambient air is increased by such heat exchange unit to a value which substantially prevents moisture from freezing adjacent such exhaust end.

8. The apparatus of claim 7 wherein the temperature of such gas is increased by such heat exchange unit to a value which substantially prevents moisture condensation adjacent such exhaust end.

9. The apparatus of claim 1 wherein such transfer units include a low stage transfer unit and wherein the difference between the temperature of gas mixture adjacent the low stage transfer unit and the temperature of gas adjacent the heat exchange unit is in excess of 90° F.

10. The apparatus of claim 9 wherein the temperature of gas mixture adjacent the low stage transfer unit is less than about −60° F.

11. The apparatus of claim 10 wherein the transfer units and the heat exchange unit are of the type which transfer heat between a refrigerant and a gas.

12. The apparatus of claim 1 wherein the vapor comprises a solvent which condenses at a temperature below about −50° F. and wherein such heat exchange unit increase the temperature of such gas to a value above ambient temperature.

* * * * *

UNITED STATES PATENT AND TRADEMARK OFFICE
CERTIFICATE OF CORRECTION

PATENT NO. : 5,108,475
DATED : April 28, 1992
INVENTOR(S) : Mark W. Briggs It is certified that error appears in the above-identified patent and that said Letters Patent is hereby corrected as shown below:

In column 1, line 15, delete "or" and insert --of--.

In column 1, line 34, delete "tne" and insert --the--.

In column 2, line 34, delete "a" and insert --as an--.

In column 6, line 5, after "12" insert a --.--.

In column 7, line 11, delete "rare" and insert --rate--.

In column 8, line 53, delete "increase" and insert --increases--.

Signed and Sealed this

Twenty-ninth Day of June, 1993

Attest:

MICHAEL K. KIRK

*Attesting Officer*      *Acting Commissioner of Patents and Trademarks*